R. W. ROSE.
DUMPING VEHICLE BODY AND HOIST THEREFOR.
APPLICATION FILED AUG. 21, 1915.
1,351,719.
Patented Aug. 31, 1920.
2 SHEETS—SHEET 1.
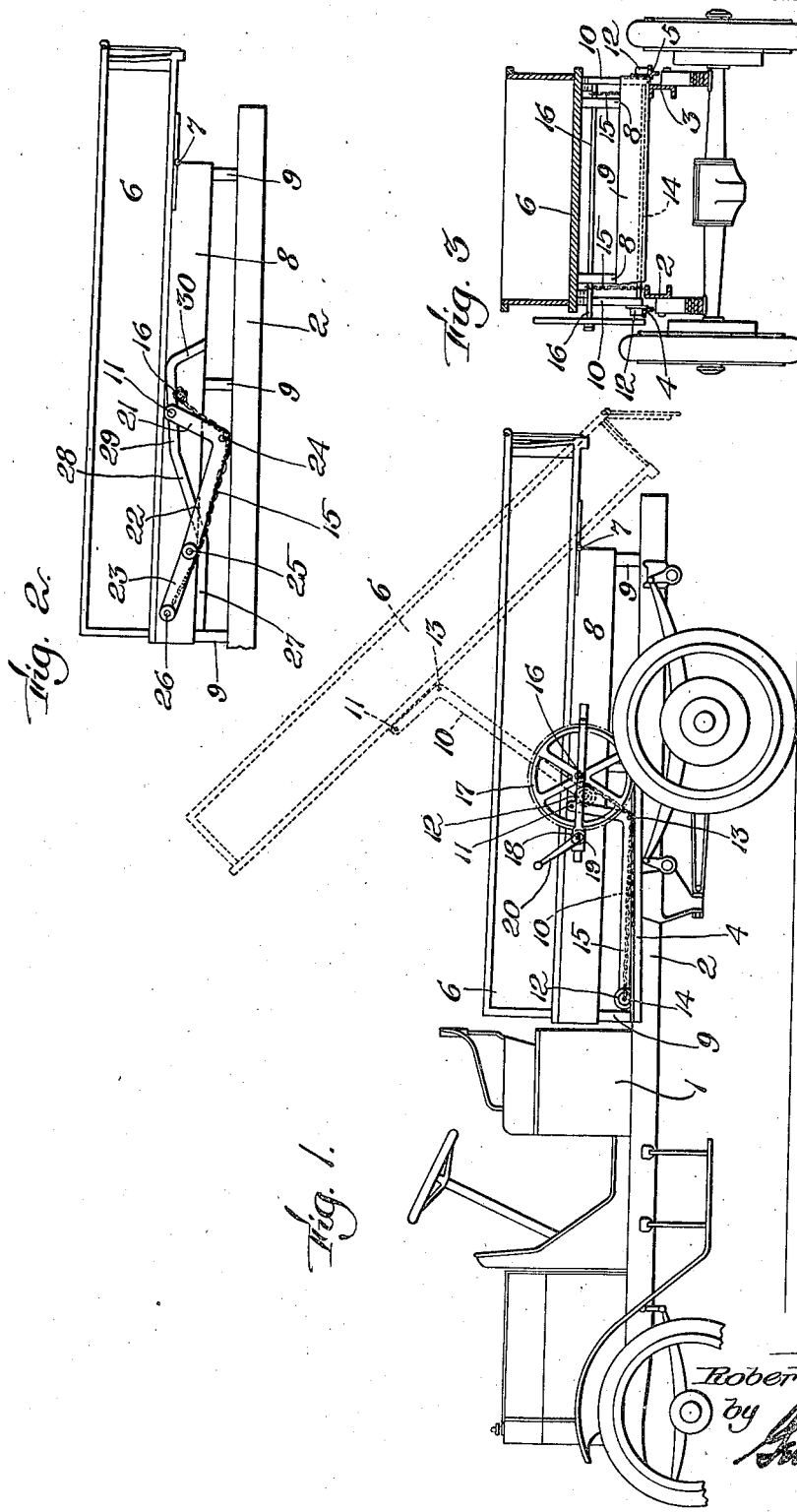

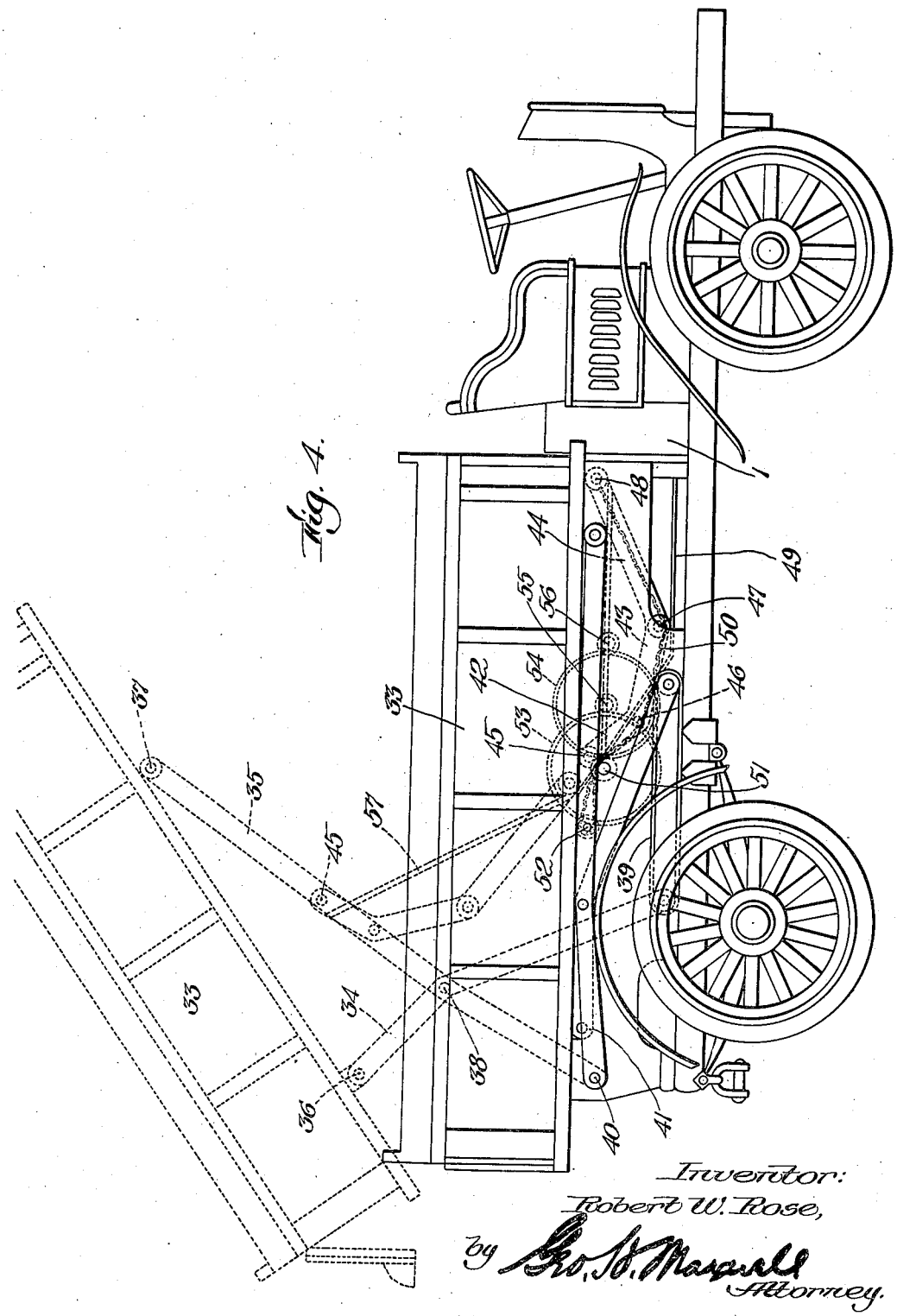

UNITED STATES PATENT OFFICE.

ROBERT W. ROSE, OF CLIFTON, MASSACHUSETTS, ASSIGNOR TO LALLY COMMERCIAL BODY COMPANY, OF EVERETT, MASSACHUSETTS, A CORPORATION OF MASSACHUSETTS.

DUMPING VEHICLE-BODY AND HOIST THEREFOR.

1,351,719.     Specification of Letters Patent.     Patented Aug. 31, 1920.

Application filed August 21, 1915. Serial No. 46,657.

*To all whom it may concern:*

Be it known that I, ROBERT W. ROSE, a citizen of the United States, and resident of Clifton, in the county of Essex and State of Massachusetts, have invented an Improvement in Dumping Vehicle - Bodies and Hoists Therefor, of which the following description, in connection with the accompanying drawings, is a specification, like letters on the drawings representing like parts.

My present invention relates to dumping bodies for vehicles, particularly for auto trucks where a large and heavy load is carried, and the object of the invention is to improve and perfect the hoisting mechanism for such bodies. In the modern large automobile trucks where a heavy load of many tons is carried, particularly difficult problems are presented in devising suitable hoisting mechanism which will enable a heavy load to be easily, quickly, and safely raised, either at one or at both ends to the desired inclination for discharging the load, and to have the hoisting mechanism occupy a minimum amount of space between the frame of the vehicle and the lower frame or bottom of the body. I have discovered a simple construction, whereby a single lever of novel form may be utilized which will be simple in construction, economical to make, difficult to get out of order, and yet which will afford a maximum hoisting power at the beginning of the lifting, with a maximum speed during the hoisting action. My hoisting mechanism comprises a pair of hoisting levers arranged at either side of the vehicle and preferably with each member pivotally secured at one end to the vehicle body itself, slightly forward of the longitudinal center, and with the other end entirely free, but with a roller bearing adapted to travel on the top of the vehicle frame or on a bracket thereupon. I utilize a gear wheel and axle construction to wind up a chain, which chain operates the hoisting levers, the wheel being turned by hand crank or otherwise. Sufficient power for hand operation being obtained by a plurality of gears and pinions. This gear and chain is of sufficient power to initiate the hoisting action, the winding up of the chain producing at the start a direct vertical lifting of the dumping body from horizontal position to an angle of inclination sufficient to then enable an increasing lifting speed, with the same amount of power applied to be effective. Preferably also, I may arrange an increasingly efficient lifting speed as the inclination of the dumping body increases, to utilize the maximum effort of the lifting power. I accomplish this arrangement by having a peculiarly "bent-arm" hoisting member at each side of the vehicle, the first hoisting action being effected by a direct substantially vertical lift by the chain which is wound up on a wheel axle, the outer free end of each bent-arm being provided with a roller which simultaneously follows along a track until the main length of the bent-arm can become effective between the vehicle frame and the angle of inclination which the dumping body has assumed after this first lift. I may provide a plurality of such rollers on the portions of the free hoisting arms, which rollers are adapted to roll on a track and take up the load at different times, preferably with successively increased speed of action.

Other details of the invention, novel combination of parts, and important advantages will be hereinafter pointed out and claimed.

In the drawings I have illustrated several forms of my novel "bent-arm" hoisting mechanism, wherein—

Figure 1 is a side view of an automobile dumping truck, embodying a simple form of my invention;

Fig. 2 is a fragmentary view of the dumping body in lowered position, showing a slightly modified form of my bent arm hoist;

Fig. 3 is an end view partly in cross section;

Fig. 4 illustrates a side view of a modified form, applied to a dumping body with "rear-end" hoist.

I have shown, in Figs. 1 and 4, my improved form of dumping body mounted on an automobile chassis, any suitable chassis or truck 1 being utilized. Such truck usually has the side bars 2 and 3 of channel iron to give the proper strength and to support side tracks of angle iron 4 and 5 respectively at each side of the body. The dumping body 6 is pivoted at 7 to a frame or support 8 carried by the channel irons 2 and 3 on cross-bars 9. To constitute the hoisting or lifting levers I use a bent arm 10 at each side of the hoisting body, having one end pivoted to the bottom frame of the tilting body 11 and a roll 12 at its opposite ends. The bent arms 10 constituting the hoisting levers are of elbow form, substantially as shown in Fig. 1, and are united by cross bars at the pivot points 11, roll carrying ends 12 and elbows 13, so that the pair of levers will act in unison. The rolls 12 are preferably flanged to run on the tracks 4 and 5. The axle of said rolls 14 extends from one roll to the other. To actuate the bent arm I provide chains 15 adjacent each arm 10 and having one end connected to the cross bar or axle 14 unite the rolls 12, then led under the cross-bar 13 at the elbows of the bent arms and upwardly to an axle 16 to which the other end of the chain is secured, and on which both are wound up. The geared wheel 17 mounted on the axle 16 is rotated by a pinion 18 on an axle 19 which is actuated by a hand lever 20, suitable bearings therefor being arranged in the support 8. Rotation of the hand lever 20 and pinion 18 turns the gear 17, axle 16 and winds up the two chains 15 at each side of the vehicle. As the chains are thus wound up the bearings of said chains on the rod 13 have a direct lift thereupon to tilt the body 6 about its pivot point 7, thereby exerting a positive, powerful, and direct lifting action on the vehicle body, initiating the inclination of the same about the rearward pivot point 7. During this initial lifting movement and until the rod 14 is raised substantially level with the winding axle 16, the bent arms 10 are moved slightly lengthwise of the vehicle. The rolls 12 moving along the tracks 4 and 5 cause this movement. When the rod 14 is substantially upon a line between the winding axle 16 and the rolls 12, the pull thereof is brought directly on the axle 14 at the roll carrying ends of the bent arm and is at a proper angle to continue the hoisting action of the bent arms. The winding of the chain may be continued until a desired angle of inclination of the body 6 is secured, at the completion of the lifting action the axle 14 can be hoisted directly up to the winding axle 16, the arms 10 sliding upwardly with the chains 15 or over the winding axle 16 during this final stage of the hoisting movement. This hoisting continues until the first vertical part of the bent arm rests against the vehicle body as shown in Fig. 1, contacting therewith from 11 to 13, and steadying the body thus inclined, the portion 10 then carrying the strain and relieving the pivots 11 therefrom.

In Fig. 2 a somewhat modified form is illustrated, wherein the bent arms have a plurality of cross rods to act as successive bearing points for the hoisting of the chains 15 and also a further length of inclined track is provided. In this form the bent arm lever comprises three sections, a short preliminary hoisting section 21, pivoted at 11 to the tilting body 6, the intermediate section 22 and a 3rd section 23, all formed somewhat in angular position. Preferably the elbow section 21 is substantially or nearly at right angles with the intermediate portion 22. Tie rod 24 at the elbow and the rods 25 and 26 at the junction of the sections 22 and 23 and at the ends of the arms 23 respectively, are extended and carry rolls to run on the tracks. The sidetracks in this form comprise a straight section 27 and inclined portions 28 and 29;—the track for convenience having an extending end 30 secured to the support 8 and acting as a strengthening member to hold the track in desired position. The hoisting chain 15 is led from the winding axle 16 under the rod 24, under the intermediate tie rod 25 and secured to the extreme end rod 26 in a manner similar to that already described in explaining the form shown in Fig. 1. Rotation of the winding axle 16 acts to initiate the lifting of the body 6 by the direct upward pull of the chains 15 from the winding axle 16 to the first cross rod 24. At the moment that the rod 24 is raised to substantially the same height as the winding chains and the strain of said chains is directly from the winding axle 16 to the intermediate cross rod 25, the rolls on said cross rod will traverse the inclined portion 28 of the track. Further and continued winding movement of the chain 15 brings the bent arm lever into position so that the end rolls on the rod 26 bear upon the track before the rolls on the rod 25 leave the same. In this form an exceptional bent arm hoist is secured, with successive variations in the application of the hoisting power, and if desired, increasing speed in the hoisting action, as the sections of the bent arm hoists and of the track inclinations can be advantageously utilized to facilitate such hoisting action. I am thus enabled to secure the benefit of a maximum hoisting power and speed consistent with any particular truck involved.

In Fig. 4 I have illustrated a still further modification of my "bent arm" hoist applied to a hoisting body where both front and rear ends of the body are to be elevated. In this form the vehicle truck 1 carries the hoisting body 33 which is raised through the action of the pivoted levers 34 and 35 pivoted at 36 near the rear of the body and with the end of the lever bearing at 37 near the forward portion of the body respectively, said levers being in pairs at each side of the vehicle, and pivoted at a common center 38, the lower end of the rod 34 being arranged to run in a slotted track 39 while the lower end of the lever 35 is pivoted at 40 to a link 41. If desired, other hoisting levers may be employed, the important feature of my present invention being that I can utilize my "bent arm" hoist in this form of vehicle to exceptional advantage. Such hoist comprises a pair of levers having three sections 42, 43 and 44 respectively, the section 42 being pivoted at 45 directly to the hoisting levers 35. Tie rods 46, 47 and 48, the two latter carrying rolls at each end to traverse a track 49 in the chassis of the vehicle are also shown. Chains 50 at each side are arranged under the tie rods 46 and 47 and attached to the end rod 48 to operate in a manner similar to that already described in connection with the bent arm hoist shown in Fig. 2. In order to secure extra length of elevation I prefer to lead the chain 50 over the axle 51, constituting one of the hoisting gear shafts and to a winding axle 52. The winding gears and pinions are illustrated in dotted lines at 53, 54 and 55 and 56, the latter receiving the operating handle. It will be understood that any desired power can be obtained through suitable proportions of the gears and pinions, between the handle on the shaft 56 and the winding axle 52. A stay rod or chain 57 is also arranged to limit the height to which the body is hoisted, which chain may be secured at any point on the chassis and to the lever 35 or to the dumping body 33. The operation of this triple bent arm hoist is similar to that already described for the form shown in Fig. 2, but acts upon the levers 34 and 35, instead of directly at a pivotal point of the dumping body 33.

Having described my invention, what I claim as new and desire to secure by Letters Patent is:

1. Hoisting apparatus of the kind described, comprising a vehicle frame having fixed tracks at each side, a dumping vehicle body adapted to be inclined on said frame about a pivot near the rear of the body, hoisting mechanism to incline said body, comprising a pair of rigid bent arms, one arm at each side of the body, each arm having a roll adapted to bear upon said track, each arm consisting of two portions extending at an angle to each other, one portion being substantially in vertical position when the body is lowered and the other portion extending horizontally, a winding shaft carried by the frame approximately in the same horizontal plane as the upper end of the vertically extending portions of the bent arms and flexible connections from said winding shaft to the outer free ends of each arm, said connections leading over the elbow at the junction of said vertical and horizontal extending portions of the arms, and means to rotate said shaft to wind up the flexible connections and operate the hoisting mechanism.

2. Hoisting apparatus of the kind described, comprising a vehicle frame having fixed tracks at each side, a dumping vehicle body adapted to be inclined on said frame about a pivot near the rear of the body, hoisting mechanism to incline said body, comprising a pair of rigid bent arms, one arm at each side of the body, each arm having a roll adapted to bear upon said track, each arm consisting of two portions extending at an angle to each other, one portion being substantially in vertical position when the body is lowered and the other portion extending horizontally, a winding shaft carried by the frame approximately in the same horizontal plane as the upper end of the vertical extending portions of the bent arms, and extending across the frame to constitute a bearing for both arms, and flexible connections from said winding shaft to the outer free ends of each arm, said connections leading over the elbow at the junction of said vertical and horizontal extending portions of the arms, and means to rotate said shaft to wind up the flexible connections and operate the hoisting mechanism, sliding the bent arms across the winding shaft at the completion of the hoisting mechanism.

In testimony whereof, I have signed my name to this specification, in the presence of two subscribing witnesses.

ROBERT W. ROSE.

Witnesses:
JAMES R. HODDER,
SEBASTIAN VAUGHAN.